United States Patent
Traktovenko et al.

(10) Patent No.: US 6,994,487 B2
(45) Date of Patent: Feb. 7, 2006

(54) ELEVATOR LOAD BEARING TERMINATION ASSEMBLY

(75) Inventors: Boris G. Traktovenko, Avon, CT (US); Richard J. Ericson, Southington, CT (US)

(73) Assignee: Otis Elevator Company, Farmington, CT (US)

( * ) Notice: Subject to any disclaimer, the term of this patent is extended or adjusted under 35 U.S.C. 154(b) by 394 days.

(21) Appl. No.: 10/036,678

(22) Filed: Dec. 21, 2001

(65) Prior Publication Data

US 2002/0154944 A1 Oct. 24, 2002

Related U.S. Application Data

(63) Continuation-in-part of application No. 09/837,825, filed on Apr. 18, 2001, now abandoned.

(51) Int. Cl.
*F16B 2/14* (2006.01)
*B66B 7/08* (2006.01)
*F16G 11/04* (2006.01)

(52) U.S. Cl. .................. 403/314; 24/136 K; 24/136 R; 24/115 M; 187/411

(58) Field of Classification Search .............. 403/314; 24/136 K, 136 B, 115 M, 136 R; 187/411
See application file for complete search history.

(56) References Cited

U.S. PATENT DOCUMENTS

| | | | | |
|---|---|---|---|---|
| 482,975 A | * | 9/1892 | Cope | ........................ 14/136 R |
| 1,644,376 A | * | 10/1927 | Haworth | |
| 2,085,333 A | * | 6/1937 | Reynolds | .............. 24/136 K X |
| 2,234,028 A | | 3/1941 | Turzicky | |
| 4,536,921 A | * | 8/1985 | Brendel et al. | ....... 24/136 K X |
| 4,602,891 A | * | 7/1986 | McBride | ............... 24/136 K X |
| 5,243,739 A | * | 9/1993 | Schmidt | .................. 24/136 R |
| 5,553,360 A | | 9/1996 | Lucas et al. | |
| 6,345,419 B1 | * | 2/2002 | Traktovenko | ............. 24/136 R |
| 6,353,979 B1 | * | 3/2002 | Traktovenko | ............. 24/136 R |
| 6,513,204 B2 | * | 2/2003 | Rivera et al. | ............. 24/136 R |
| 2002/0154945 A1 | * | 10/2002 | Ericson | |
| 2003/0041419 A1 | * | 3/2003 | Perez et al. | ............... 24/136 R |

FOREIGN PATENT DOCUMENTS

DE 32 17 885 A1 11/1983
GB 456358 11/1936

* cited by examiner

*Primary Examiner*—Daniel P. Stodola
*Assistant Examiner*—Ryan M. Flandro
(74) *Attorney, Agent, or Firm*—Carlson, Gaskey & Olds

(57) ABSTRACT

A device for securing an end on a load bearing member in an elevator system includes a socket portion and a wedge portion. The socket and wedge preferably are made from an extruded piece of metal or a formed piece of sheet metal material. A brace member secures the wedge within the socket portion to maintain the wedge, and the corresponding portion of the load bearing member in place within the socket portion. The preferred arrangement includes friction enhancing surfaces on the corresponding portions of the socket and the wedge to facilitate maintaining the load bearing member in place.

26 Claims, 4 Drawing Sheets

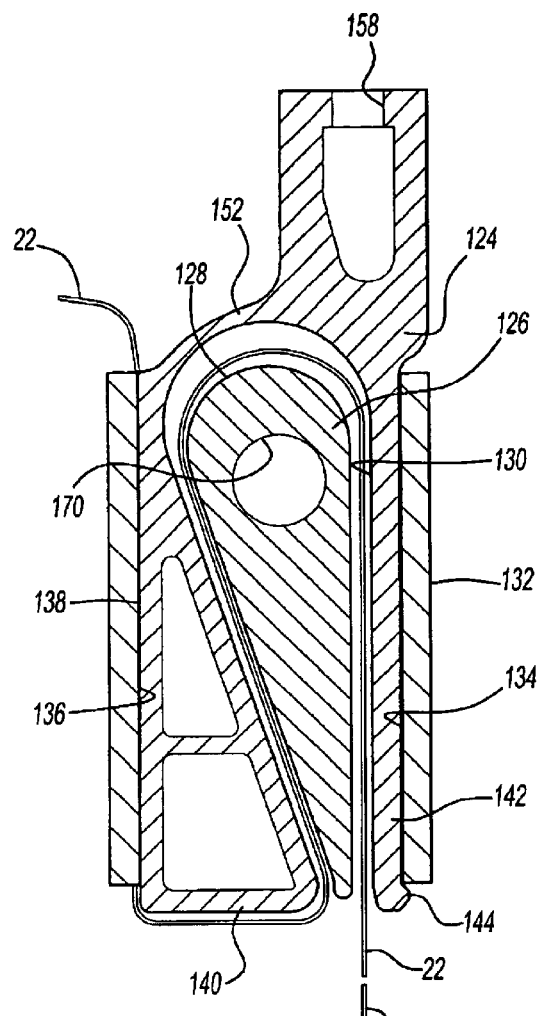
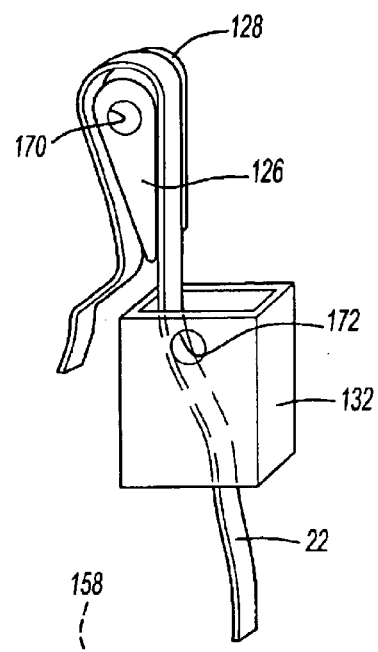
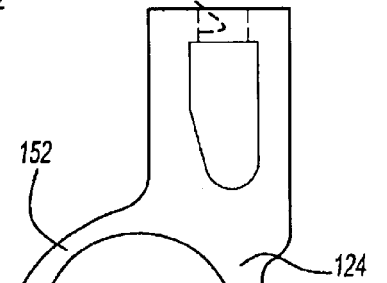
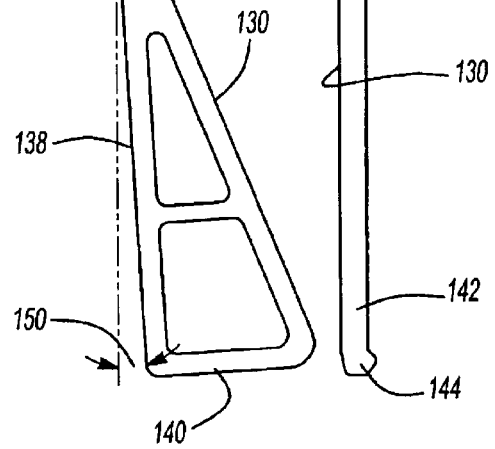

ELEVATOR LOAD BEARING TERMINATION ASSEMBLY

CROSS REFERENCE TO RELATED APPLICATIONS

This application is a continuation-in-part of the application having Ser. No. 09/837,825, which was filed on Apr. 18, 2001, now abandoned.

BACKGROUND OF THE INVENTION

This invention generally relates to elevator support systems. More particularly, this invention relates to a device for securing an end of a load bearing arrangement in an elevator system.

Elevator systems typically include some form of load bearing arrangement, such as roping or a belt for supporting and moving the cab through the hoistway as desired. In some situations, the belt couples a counterweight to the cab.

Regardless of the specific configuration of the elevator system, it typically is necessary to secure ends of the belt to an appropriate structure within the elevator system. A variety of configurations of assemblies for securing the ends of a belt in an elevator system have been used. One example includes a cast socket and wedge arrangement where a portion of the belt is secured between a socket and wedge. One drawback associated with currently used termination arrangements is that the casting process is relatively expensive. The typical number of such terminations required multiplies the undesirable, additional expense. Another shortcoming of current systems is that the casting process is not accurate enough to provide the dimensional tolerances needed for many situations.

There is a need for an improved elevator load bearing termination arrangement. This invention addresses that need, overcomes the shortcomings described above and provides significant cost savings.

SUMMARY OF THE INVENTION

In general terms, this invention is a device for securing an end of a load bearing member in an elevator system. The device includes an extruded socket and an extruded wedge. The socket has an interior surface against which a portion of the load bearing member is received. The wedge has an exterior surface that is received against the load bearing member when the wedge is positioned within the socket. At least one brace member supports the socket and assists maintaining the wedge in position within the socket.

In one preferred embodiment, the brace member is a single piece, extruded metal part. At least a portion of the load bearing member (i.e., the belt) preferably is received between the brace member and the socket.

In one preferred embodiment the wedge and socket have corresponding surfaces that engage the load bearing member. The engaging surfaces preferably have a constant profile. In one example, the load bearing member engaging surfaces have a friction-enhancing surface.

The various features and advantages of this invention will become apparent to those skilled in the art from the following detailed description of the currently preferred embodiments. The drawings that accompany the detailed description can be briefly described as follows.

BRIEF DESCRIPTION OF THE DRAWINGS

FIG. 5 is a cross sectional illustration taken along the lines 5—5 in FIG. 4.

FIG. 6 schematically illustrates a portion of an example assembly process using the embodiment of FIG. 4.

FIG. 7 schematically illustrates a preferred feature of the socket portion of the embodiment of FIG. 4.

DETAILED DESCRIPTION OF THE PREFERRED EMBODIMENTS

Figure 1:
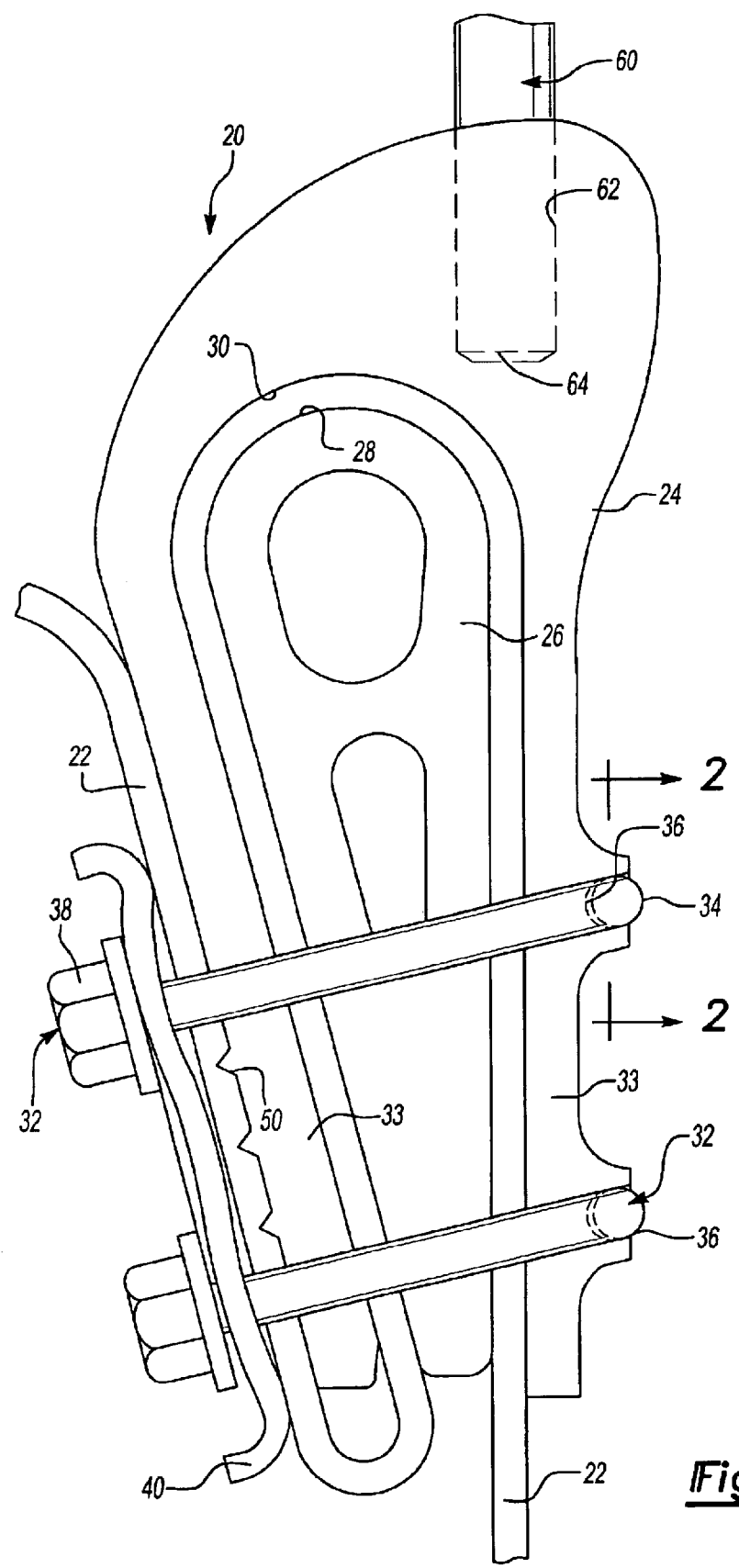
FIG. 1 diagrammatically illustrates an example device designed according to an embodiment of this invention.

As shown in FIG. 1, a device 20 for handling an end of a load bearing member 22 in an elevator system includes a socket portion 24 and a wedge portion 26.

The load bearing member 22 in the illustrated example is a coated steel belt. This invention is not limited, however, to coated steel belts. Rather, any load bearing member within an elevator system that can be accommodated using a socket and wedge arrangement designed according to this invention may be used. The term "belt" as used in this description should not be construed in its strictest sense. It should be considered synonymous with roping or load bearing member.

The socket portion 24 and wedge portion 26 preferably are extruded or otherwise formed from sheet metal material. An extrusion or other sheet metal forming process provide the advantage of achieving close tolerances and manufacturing economies. Using an extrusion process or otherwise forming sheet metal, allows for the cooperating surfaces on the socket portion 24 and the wedge portion 26 to be exactly parallel. A constant profile cross section on each is preferred to ensure stability in securing the end of the load bearing member 22. Additionally, using the extrusion or other sheet metal forming process permits a cost savings on the order of fifty percent compared to conventional casting processes. Given this description, those skilled in the art will realize whether an extrusion or other forming process best suits the needs of their particular situation.

The wedge portion 26 has an outer surface 28 that is received against the belt 22 when the wedge 26 is positioned within the socket 24. An inner surface 30 on the socket portion 24 engages the other side of the belt 22. Accordingly, the belt 22 is secured between the wedge portion 26 and socket portion 24 so that it is held in place. In the preferred embodiment, the outer surface 28 on the wedge portion has a friction enhanced surface. In one example, the surface includes grooves having a so-called saw tooth profile. In another example, the outer surface 28 on the wedge portion is roughened using a sandblasting or other conventional technique. Similarly, the inner surface 30 on the socket portion 24 preferably has a friction enhanced texture.

The preferred arrangement includes at least one brace member 32 that maintains the legs 33 of the socket portion 24 in position to hold on to the wedge portion 26 and the corresponding portion of the belt 22. The illustrated example of FIGS. 1–3 includes two U-bolts 32 that operate as the brace member. Because the socket portion 24 is preferably extruded, it may be susceptible to being pried open by the forces imposed on the wedge portion 26 as the load bearing member 22 is under tension in the elevator system.

A portion 34 of the U-bolts 32 preferably is received within a corresponding surface 36 on the socket portion 24. The preferred arrangement includes a configuration of the receiver portion 36 such that the portion 34 of each U-bolt snaps and locks into place against the socket 24. The U-bolt preferably is rotatable about the axis of the portion 34 after it has been snapped into place on the socket portion 24. Conventional nuts 38 preferably are used to secure the legs 33 of the socket portion 24 into the desired position.

Figure 2:
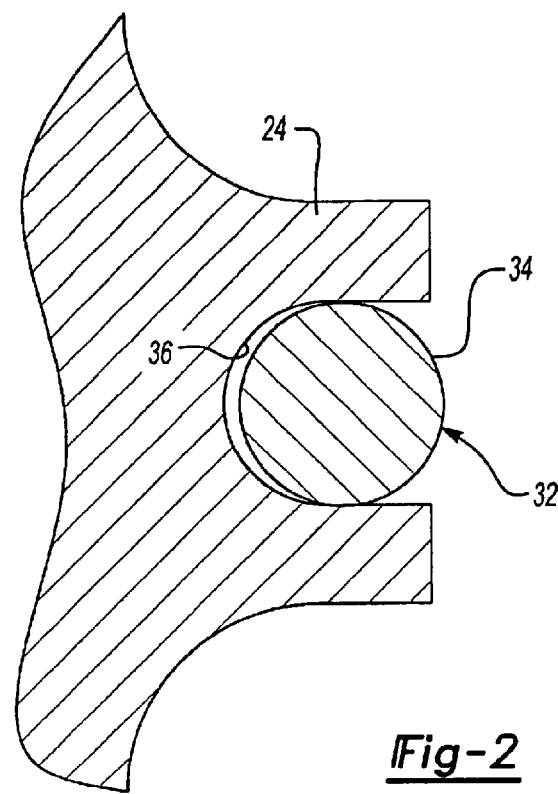
FIG. 2 is a cross sectional view of a selected portion of the embodiment of FIG. 1.
Figure 3:
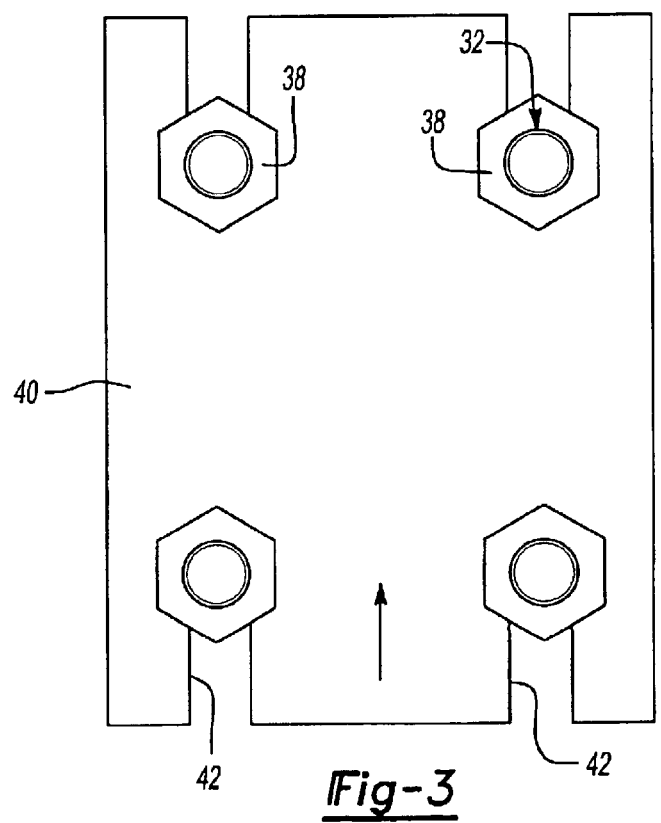
FIG. 3 illustrates a preferred detail of a portion of the embodiment of FIG. 1.

The example shown in FIGS. 1–3 includes a securing member 40 that secures a terminal end 22' of the load bearing member 22 against an outer surface on the socket 24. The illustrated example securing member 40 is a spring clip. The spring clip preferably cooperates with the brace members 32 to hold the terminal end 22' of the belt in place. The spring clip 40 further serves the purpose of maintaining steel load bearing members within the belt 22 in position even in the event that a urethane coating, for example, on the belt 22 were to be damaged.

The spring clip 40 preferably includes slot portions 42 that receive corresponding portions of the U-bolts 32. During assembly, the spring clip 40 can be positioned in place and the U-bolts rotated about the axis of the portions 34 until the bolts are appropriately received within the slots 42. Then the nuts 38 are appropriately tightened to properly secure the end of the belt 22 in place.

The outer surface of the socket preferably includes a friction enhancing surface 50 that facilitates maintaining the end 22' of the belt against the outer surface of the socket portion 24. In one example, the friction enhancing surface includes raised portions on the outer surface that effectively grip the belt.

The assembly 20 facilitates securing the end of the belt 22 to another portion of the elevator system as is conventionally needed. The illustrated example shows a rod 60 that has a threaded end 62 that is received within a threaded opening 64 on the socket portion 24.

FIGS. 4 through 7 illustrate another preferred embodiment. In this example, the assembly 20' includes a socket portion 124 and a wedge portion 126 that cooperate in a similar fashion to the socket and wedge portions of the previous example. The wedge portion 126 in this example preferably has a friction enhanced, belt-engaging surface 128 along the exterior surface of the wedge portion 126. The belt-engaging surfaces 130 on the inside of the socket portion 124 preferably are similarly fashioned. In one example, a so-called saw tooth profile extends across the belt engaging surfaces. A variety of surface textures or enhancements are within the scope of this invention.

Figure 4:
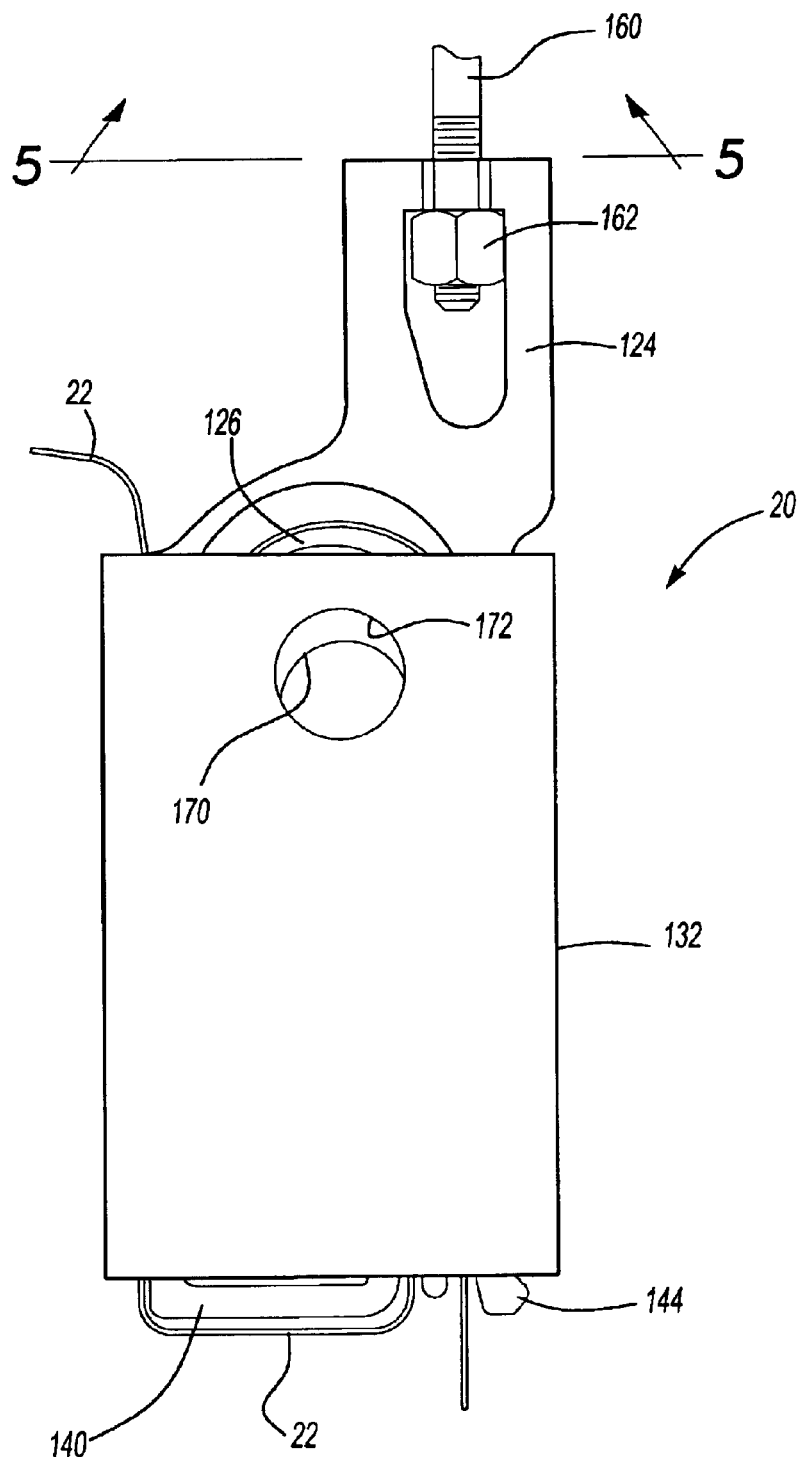
FIG. 4 diagrammatically illustrates another example device designed according to an embodiment of this invention.

One difference between the example of FIGS. 4 through 7 compared to that of FIGS. 1 through 3 is that a brace member 132 as best seen in FIGS. 4 and 5 comprises an extruded metal part. In this example, the brace member is generally rectangular and is made as a single piece. The extruded brace 132 fits over the combined socket 124, wedge 126 and the appropriate portions of the load bearing member 22. The illustrated brace member 132 includes a first interior surface 134 that engages one side of the exterior of the socket 124. Another interior surface 136 preferably engages the load bearing member 22. Accordingly, a portion of the load bearing member 22 is received between the surface 136 on the brace member 132 and the exterior surface 138 on one leg 140 of the socket portion 124. The surfaces 136 and 138 preferably are fashioned to provide a friction-enhanced surface so that a better grip on the load bearing member 22 is achieved.

The socket portion 124 preferably includes two leg portions. One leg portion 140 is positioned on one side of the wedge portion 126 after assembly while the other leg 142 is positioned on the other side. The leg 142 preferably includes a projection 144 near one end of the leg 142. The projection 144 facilitates maintaining the brace 132 on the socket portion 124 during assembly.

The leg 140 preferably is initially aligned relative to the leg 142 so that the outer surfaces of the two legs are not parallel to each other. In the illustrated example, the outer surface 138 on the leg 140 is positioned at an angle 150 relative to an alignment of the exterior surface on the leg 142. This non-parallel alignment preferably is established during the extrusion process for making the socket portion 124. The portion 152 of the socket preferably is compliant enough to allow the leg portion 144 to move into a parallel alignment with the leg 142 during assembly and while the termination device 20' is in service.

Referring to FIGS. 5 and 6, the belt or load bearing member 22 preferably is positioned around the outer surface 128 of the wedge portion 126. It may be advantageous to initially "thread" the selected portion of the belt 22 through the opening in the brace member 132. After the appropriate portion of the belt 22 has been wrapped around the exterior 128 of the wedge 126, the belt 22 and wedge 126 preferably are placed into the socket 124. The illustrated arrangement allows for the wedge and belt to be inserted from the side (i.e., into the page in FIG. 5). The brace member 132 preferably is then slid onto the socket member 124, capturing an appropriate portion of the belt 22 between the surfaces 136 and 138. The projection 144 on the leg 142 operates to hold the brace member 132 in place over the socket portion 124. As the force F draws the wedge 126 downward (according to the illustrations), the leg 140 moves into a parallel alignment with the leg 144 and the load bearing member 22 is securely gripped between the socket 124, wedge 126 and brace member 132. The belt 22 is compressed not only between the wedge and socket but also between the socket and brace member, which provides extra holding force.

The socket portion 124 preferably includes an opening 158 for receiving a rod 160 that can be secured in place using a threaded member 162 such as a conventional bolt and nut connection.

The illustrated example includes a unique disassembly feature. The wedge portion 126 preferably includes an opening 170 extending at least partially into the wedge 126 and, in one preferred embodiment, through the wedge portion 126. The brace member 132 preferably includes an opening 172 extending through at least one of the sidewalls of the brace. The holes 170 and 172 preferably face in the same direction when the device is assembled. The force F that draws the wedge portion 126 downward (according to the drawings) causes a misalignment between the openings 170 and 172. When it is desirable to remove the belt 22 from the termination assembly 20', a screwdriver or other prying tool can be inserted into the openings 170 and 172. Manipulation of the tool allows forcing the wedge portion 126 back deeper into the socket portion 124 (i.e., upward according to the drawings). In that position, the leg 140 is free to move closer to the leg 142 so that the brace member 132 can be slid over the projection 144 and off of the socket 124. It is preferred to design the openings 170 and 172 so that the releasing prying motion urges the brace member 132 at least partially over the projection 144 to facilitate easy removal of the brace member 132 from the socket portion 124.

In the illustrated example, all tension forces from the load bearing member 22 are taken by the socket portion 124 while all spreading forces induced by the wedge portion 126 are taken by the brace member 132. Accordingly, in this example the function of the tension forces and the spreading forces are separated and handled by two separate components. This arrangement increases the structural strength of the termination assembly 20'.

Another advantage associated with this invention is that it provides an increased breaking strength of the belt 22. In most arrangements, within the termination assembly the tensile stress on the belt 22 from the load is typically at a maximum at the point where the belt 22 enters the termination assembly. Tensile stress on the belt 22 is lower along the length of the belt inside of the socket portion 124 because of friction. The stress on the belt 22 is a combination of the tensile stress and orthogonal compressive stress from the wedging force introduced by the termination assembly. When wedging pressure is evenly distributed, vonMises stress at the entrance of the termination assembly is at a maximum.

By appropriately selecting the geometry of the wedge and socket belt-engaging surfaces, it is possible with this invention to redistribute wedging pressure in a manner such that the maximum pressure is inside of the socket where the tensile stress on the belt 22 is lower. Such an arrangement increases the braking force of the rope. Because this invention includes using extruded wedge and socket portions, achieving the desired profile of the components is economically feasible in optimizing the extruded surfaces of the wedge and the socket introduces no additional cost.

The preceding description is exemplary rather than limiting in nature. Variations and modifications to the disclosed embodiment may become apparent to those skilled in the art that do not necessarily depart from the purview and spirit of this invention. The scope of legal protection given to this invention can only be determined by studying the following claims.

We claim:

1. A device for securing an end of an elongated load bearing member in an elevator system, comprising:
    a socket portion having oppositely facing engaging surfaces inside the socket portion;
    a wedge portion that is at least partially received within the socket portion such that a portion of the elongated load bearing member is received between the engaging surfaces of the socket portion and the wedge portion; and
    at least one brace member that secures the wedge portion within the socket portion where the brace member has an engaging surface on an inside of the brace member and the socket portion includes a cooperating engaging surface on an outside of the socket portion for holding a section of the load bearing member between the socket portion outside engaging surface and the brace member inside engaging surface.

2. The device of claim 1, wherein the socket portion is an extruded metal piece.

3. The device of claim 1, wherein the wedge portion is an extruded metal piece.

4. The device of claim 1, wherein the socket portion and the wedge portion have a constant cross sectional profile.

5. The device of claim 1, wherein the brace member comprises a U-bolt.

6. The device of claim 5, wherein the socket portion includes a receiver portion that receives a corresponding portion of the U-bolt and permits the U-bolt to move about the axis of the corresponding portion relative to the socket portion.

7. The device of claim 6, including a securing member that secures a terminal end of the elongated load bearing member against an outer surface on the socket portion.

8. The device of claim 7, wherein the securing member comprises a spring clip.

9. The device of claim 8, wherein the spring clip includes a plurality of slots for receiving a portion of the U-bolt as the U-bolt is moved relative to the socket portion.

10. The device of claim 1, wherein the brace is an extruded metal piece that is received at least partially around the socket.

11. The device of claim 10, wherein the socket includes a projection that operates to hold the brace in place on the socket.

12. The device of claim 1, wherein the brace includes an opening through at least one sidewall of the brace and the wedge portion includes an opening, the openings being situated such that a tool can be received into the openings and utilized to manipulate the wedge portion relative to the brace.

13. A device for securing an end of an elongated load bearing member in an elevator system, comprising:
    an extruded socket portion having oppositely facing engaging surfaces inside the socket portion; and
    an extruded wedge portion that is at least partially received within the socket portion such that a portion of the elongated load bearing member is received between the engaging surfaces of the socket portion and the wedge portion.

14. The device of claim 13, including at least one brace member that secures the wedge portion within the socket portion.

15. The device of claim 14, wherein the brace member is an extruded metal piece.

16. The device of claim 15, wherein the socket includes a projection that operates to hold the brace in place on the socket.

17. The device of claim 15, wherein the brace includes an opening through at least one sidewall of the brace and the wedge portion includes an opening, the openings being situated such that a tool can be received into the openings and utilized to manipulate the wedge portion relative to the brace.

18. The device of claim 13, wherein the socket portion includes a first and a second leg, the first leg being obliquely oriented relative to the second leg and being moveable into a generally parallel alignment with the second leg responsive to movement of the wedge portion within the socket portion.

19. The device of claim 13, including a brace portion that secures the wedge portion within the socket portion and wherein the brace portion includes a load bearing member engaging surface that is adapted to secure a portion of the load bearing member between the brace member and the socket portion.

20. The device of claim 1, wherein the wedge portion has oppositely facing engaging surfaces on an outside of the wedge portion and wherein one section of the elongated load bearing member is held between one of the wedge portion engaging surfaces and one of the socket portion engaging surfaces and wherein another section of the load bearing member is held between the other wedge portion engaging surface and the other socket portion engaging surface.

21. The device of claim 1, wherein the engaging surfaces on the socket portion are part of a continuous engaging surface inside the socket portion.

22. The device of claim 13, wherein the engaging surfaces on the socket portion are part of a continuous engaging surface inside the socket portion.

23. The device of claim 13, wherein the wedge portion has oppositely facing engaging surfaces on an outside of the wedge portion and a first section of the load bearing member is held between one of the wedge portion engaging faces and one of the socket portion engaging faces and another section of the load bearing member is held between the other wedge portion engaging surface and the other socket portion engaging surface.

24. The device of claim 14, where the brace member has an engaging surface on an inside of the brace member and the socket portion includes a cooperating engaging surface on an outside of the socket portion for holding a section of the load bearing member between the socket portion outside engaging surface and the brace member inside engaging surface.

25. A device for securing an end of an elongated load bearing member in an elevator system, comprising:

a socket portion;

a wedge portion that is at least partially received within the socket portion such that a portion of the elongated load bearing member is received between the socket portion and the wedge portion; and at least one brace member that secures the wedge portion within the socket portion, the brace member including an opening through at least one side wall of the brace member and the wedge portion including an opening, the openings being situated such that a tool can be received into the openings and utilized to manipulate the wedge portion relative to the brace.

26. A device for securing an end of an elongated load bearing member in an elevator system, comprising:

a socket portion having oppositely facing engaging surfaces inside the socket portion;

a wedge portion that is at least partially received within the socket portion such that a portion of the elongated load bearing member is received between the engaging surfaces of the socket portion and the wedge portion; and at least one brace member that secures the wedge portion within the socket portion wherein the socket portion and the wedge portion have a constant cross sectional profile.

* * * * *